United States Patent
Aivaliotis et al.

(10) Patent No.: US 8,738,191 B2
(45) Date of Patent: May 27, 2014

(54) SYSTEM AND METHOD FOR POWER GRID MANAGEMENT

(76) Inventors: Sarantos K. Aivaliotis, Ridgefield, CT (US); Zenon R. Stelmak, Monroe, CT (US); Robert D. Mohr, Tigard, OR (US); Marija Ilic, Sudbury, MA (US); Jeffrey H. Lang, Sudbury, MA (US); Bruce Fardanesh, Upper Saddle River, NJ (US); Mark R. Graham, White Plains, NY (US); Liana Menemenlis-Hopkins, White Plains, NY (US); Jennifer Mayadas-Dering, Cross River, NY (US); Georgios K. Stefopoulos, White Plains, NY (US)

( * ) Notice: Subject to any disclaimer, the term of this patent is extended or adjusted under 35 U.S.C. 154(b) by 0 days.

(21) Appl. No.: 13/234,610

(22) Filed: Sep. 16, 2011

(65) Prior Publication Data

US 2012/0179301 A1    Jul. 12, 2012

Related U.S. Application Data

(60) Provisional application No. 61/403,638, filed on Sep. 17, 2010.

(51) Int. Cl.
*G05D 29/00* (2006.01)

(52) U.S. Cl.
USPC ........... 700/286; 700/291; 700/292; 700/297; 700/294; 700/298

(58) Field of Classification Search
None
See application file for complete search history.

(56) References Cited

U.S. PATENT DOCUMENTS

| | | | | |
|---|---|---|---|---|
| 5,235,861 | A * | 8/1993 | Seppa | 73/862.391 |
| 6,313,752 | B1 * | 11/2001 | Corrigan et al. | 340/657 |
| 6,523,424 | B1 * | 2/2003 | Hayes et al. | 73/862.391 |
| 6,598,003 | B1 * | 7/2003 | Heino et al. | 702/68 |
| 6,754,597 | B2 * | 6/2004 | Bertsch et al. | 702/57 |
| 7,092,798 | B2 * | 8/2006 | Mansingh et al. | 700/292 |
| 7,107,162 | B2 * | 9/2006 | Zima et al. | 702/65 |
| 7,494,271 | B2 * | 2/2009 | Scholtz et al. | 374/45 |
| 7,516,051 | B2 * | 4/2009 | Johnson et al. | 703/2 |
| 7,620,517 | B2 * | 11/2009 | Scholtz et al. | 702/130 |
| 7,930,070 | B2 * | 4/2011 | Imes | 700/291 |
| 7,930,117 | B2 * | 4/2011 | Guzman-Casillas | 702/60 |
| 7,979,167 | B2 * | 7/2011 | Delmerico et al. | 700/291 |
| 8,060,259 | B2 * | 11/2011 | Budhraja et al. | 700/291 |
| 8,126,667 | B2 * | 2/2012 | Zhang et al. | 702/65 |
| 8,126,685 | B2 * | 2/2012 | Nasle | 703/4 |

(Continued)

FOREIGN PATENT DOCUMENTS

EP    1134867    9/2001

OTHER PUBLICATIONS

International Search Report dated Apr. 3, 2012, for PCT/IB2011/002578.

*Primary Examiner* — Kavita Padmanabhan
*Assistant Examiner* — Christopher E Everett
(74) *Attorney, Agent, or Firm* — Sofer & Haroun, LLP

(57) ABSTRACT

A system for monitoring a power transmission line includes at least one monitoring device located along the power transmission line configured to provide power transmission line data. A wide area situational awareness module is configured to receive the power transmission line data and an adaptation module is configured to receive output from the wide area situational awareness module and further configured to calculate control actions for the power transmission line based on the power transmission line data.

10 Claims, 4 Drawing Sheets

(56) References Cited

U.S. PATENT DOCUMENTS

| | | | |
|---|---|---|---|
| 2003/0014678 A1* | 1/2003 | Ozcetin et al. | 713/400 |
| 2007/0038396 A1* | 2/2007 | Zima et al. | 702/65 |
| 2008/0262758 A1* | 10/2008 | Rehtanz et al. | 702/57 |
| 2010/0114392 A1 | 5/2010 | Lancaster | |
| 2010/0292857 A1* | 11/2010 | Bose et al. | 700/292 |
| 2011/0066301 A1* | 3/2011 | Donolo | 700/292 |
| 2011/0282508 A1* | 11/2011 | Goutard et al. | 700/293 |
| 2012/0022707 A1* | 1/2012 | Budhraja et al. | 700/292 |
| 2012/0041611 A1* | 2/2012 | Zhang et al. | 700/292 |

* cited by examiner

SYSTEM AND METHOD FOR POWER GRID MANAGEMENT

RELATED APPLICATION

This application claims the benefit of priority from U.S. Provisional Patent Application No. 61/403,638, filed on Sep. 17, 2010, the entirety of which is incorporated by reference.

BACKGROUND

1. Field of the Invention

This application relates to power grid management. More particularly, this application relates to an arrangement for power grid monitoring.

2. Description of the Related Art

Electric power systems, for quite some time, have been exposed to delivery patterns for which the transmission and distribution (T&D) equipment was not designed. This is basically a result of a combination of reasons such as adding many non-utility-owned generators at various locations throughout the existing power grid, incorporating intermittent renewable energy resources of various technologies, servicing non-traditional types of loads (electronics, modern control systems, data centers, high-tech manufacturing equipment, plug-in electric vehicles etc. . . . ) as well as the consequent needs for economic power transfers across wide areas instead of only the limited areas for which the T&D equipment was designed.

Moreover, today's operating and planning practices do not rely on adaptation of available resources as system conditions vary. Instead, the worst-case preventive off-line simulations and studies are the basis for how the resources are used as a whole. This approach generally results in hard-to-ensure security as conditions vary significantly outside of the regions for which the system was designed, and, as rule, to underutilization of resources.

In addition, firm point-to-point bilateral energy contracts superposed on top of coordinated least-cost generation dispatch by the system operators have created hard-to-track parallel flows within and between once loosely coupled control areas. Most recently, the trend to deploy unconventional intermittent resources and connect them to the electric power grid is likely to even further change the T&D power flow patterns once well understood by the system operators.

The overall complexity is likely to increase to the point of being hard to manage using today's industry practices. The complexity is further increased by much faster and larger fluctuations of power injections from their forecasted schedules than with conventional generation resulting in hard-to-predict variations in system operating conditions, as these new resources create qualitatively different transmission interface (flow gate) and line flow patterns.

Furthermore, grid system complexity is increased by the installation and utilization of modern generation and T&D control devices, which aim to substantially improve the power system performance. However, they need proper control decisions and actions in order to achieve such a goal. If this is not the case, such devices are underutilized in the power grid. There exists an entire range of controllers available for typical modern electric power systems but they are not currently coordinated in a systematic way to accommodate broader ranges of operating conditions more efficiently and without endangering system security in the existing prior art systems.

Such controls may include (1) governors of power plants, Automatic Voltage Regulators (AVRs) and Power Systems Stabilizers (PSSs) on power plants, capable of controlling power generated, and terminal voltage, respectively; (2) a variety of mechanically-controllable T&D equipment, such as On-Load Tap Changing Transformers (OLTCs), Shunt Capacitor Banks (ShCBs), Series Capacitor Banks (SCBs) and Phase Angle Regulators (PARs), capable of controlling voltage at the sending or receiving lines, voltages at the buses to which they are connected, and flows through the transmission lines to which they are connected, respectively. More recently, new power-electronically controllable versions of these devices, known as modern flexible AC transmission systems (FACTS) devices, capable of controlling separately or simultaneously voltages and line flows at specific system locations have become an option as well. Such devices are promising because of their ability to avoid wear-and-tear of the basic equipment being controlled by avoiding mechanical stress of concern when using traditional ShCB, SCB, PARs. They are also capable of implementing much faster adjustments to their controlled set points as these are changed. For example, when properly tuned these devices could avoid the danger of creating fast instabilities as the set points of the controllable equipment are being adapted to the changing operating conditions.

Turning back to the operating protocols for such equipment used when managing a power grid, many previously defined prior art protocols for operating the system reliably during both normal and contingency conditions have problems finding a feasible operating point or result in operating conditions that prevent the most efficient and cleanest utilization of the existing generating resources due to reliability-related constraints. Under different situations such operating conditions might not be optimal, which could be further improved by proper utilization and arrangement of existing T&D equipment, which never the less, in current systems, is not fully utilized due to insufficient control decisions resulting from reduced situational awareness or reduced knowledge of control algorithms for optimally operating such equipment.

OBJECTS AND SUMMARY

The present arrangement provides better utilization of system-wide resources in a power grid as conditions vary outside the narrow ranges of operation assumed when the system design was done, and includes more reliance on adaptation over broad ranges of conditions. This is achieved in the present arrangement, at least in part by on-line adjustments of set points of all the line monitoring devices.

In order to deal with and improve the currently employed power transmission protocols the present arrangement provides accurate knowledge of the system condition in near real time, for wide-area situational awareness (WASA), and uses this information to adjust key available resources on-line in order to reliably and efficiently balance supply and demand, keeping in mind ultimate benefits to the end users and system as a whole.

Moreover, the deployment of phasor measurement units (PMUs) and other fast and accurate sensing technologies provide a more accurate and real-time assessment of the grid/system conditions via enhanced state solution/estimation technologies. At the same time, since physical limits of various pieces of equipment could change with ambient conditions, the present arrangement simultaneously employs dynamic line rating (DLR) units arranged to better estimate and ultimately predict more accurately the actual equipment limits, such as the actual thermal limits of transmission lines in real time. Additionally, fast and accurate sensors and supporting communications are used to actually modify the line limits defined by stability concerns.

Given the progress in measurement and sensing technologies, the present arrangement provides a system operator with critical information about the grid/system status from various, geographically dispersed locations of the system in near real time. Such information involves telemetry measurements from electrical (voltage and current) and potentially mechanical (temperature, position, speed, vibrations, etc. . . . ) quantities from equipment across the control area of interest, as well as status information (open/closed) of circuit breakers, which indicates the actual topology of the system in real-time. The information may also include typical state estimation output, such as voltage magnitudes and angles at all nodes, real and reactive power injected by power plants, or withdrawn by the loads at the bus locations, real and reactive power line flows, as well as the status of system equipment (connected vs. disconnected). For WASA reasons, system operators prefer to have full observation of such information. As part of combining traditional SCADA with the PMU measurements, not necessarily available everywhere on the system, the present arrangement also provides relative relevancy data for such measurements.

The present arrangement makes it possible to use on-line measurements to make decisions about enhancing the T&D equipment at the key locations and adjusting it in real time in order to better utilize energy resources. Maximum utilization of the existing assets and optimized operation of the power grid delivers additional benefits such as better utilization of all available resources, including renewable resources, both economically and from the system reliability point of view, as well as in terms of greenhouse gas emissions reduction.

In applying optimization techniques for enhanced operation of power systems, the present arrangements starting point is a feasible solution, that is a solved power flow case based on the output of the state estimator/solver. This is achieved by solving the large-scale system of algebraic power-flow equations, formulated by applying the power-balance constraints (essentially Kirchhoff's current law) at each system bus (node) and imposing constraints arising from the operating mode of each generating unit. The bus voltages phasors at each system bus are the state variables that are solved for (or estimated), white the generator, T&D equipment, or other control equipment settings are considered control variables. These control variables can be fixed, in a simple problem formulation, or can be allowed to vary, in more advanced approaches, depending on the type of control actions that are taken into consideration. Depending on the problem formulation and the utilized modeling approach, state and control variables may be defined differently or interchanged, resulting, however, in a consistent mathematical system, in any case.

The constraints on each state (primarily bus voltage phasors, along with other possible quantities that can be considered part of the system state, for example, transformer tap positions) or the calculated values derived from the state values, such as line flows (defined either as electric current or rather power through the line) require the limit values to be set.

In this context, a planning case is used for obtaining this representative power case. Voltages and flows are computed for peak forecast demand. For this case, critical equipment failures (contingencies) are found which are most limiting to the feasible power flow solution. The constraints on each state or the calculated values derived from the state value (such as line flows require the limit values to be set.

Traditionally in the prior art, as noted above, these thermal power flow line limits are fixed based on certain ambient assumptions and operating conditions and are mostly overly-conservative. The thermal limits are generally dependent on ambient conditions. The present arrangement introduces a methodology and arrangement of equipment to dynamically estimate and update these limits to reflect the actual line/grid limits based on actual ambient and operating conditions and, when possible, to utilize the otherwise unused but safe capacity of the power system resulting from the difference between actual and pre-fixed limits. It is noted that, the unused capacity is generally considered to be the difference between the thermal line power flow limit and the base case feasible line flows. It is important to keep in mind that this unused capacity varies as a function of thermal line flow limits, as well as a function of the feasible line power flows. The latter are functions of set points on the controllable generation, T&D and demand equipment. These set points are considered to be either given inputs (real power generation), or parameters (voltages of generators and controllable T&D equipment) when power flow computations are carried out.

It is an object of the present arrangement to use new computational tools to allow regional and state transmission systems to operate more efficiently and to support deployment of clean power and accommodate demand-responsive load, in an optimized, cost-effective manner.

Thus the present system provides an arrangement of line monitoring equipment and system architecture and control for the same that allows for the adjusting of the set points of the controllable generation and T&D equipment according to a well-defined performance metrics which measures reliability and/or efficiency and/or their trade-offs. At least one direct benefit from the described arrangement is that it enables, as best as possible, power flows within the equipment constraints (thermal line flow limits, bus voltage limits, etc. . . . ) by adjusting the set points of controllable equipment. Major gains are achieved from operating within the actual and accurate thermal line flow limits, rather than by reducing these to the proxy line flow limits currently necessary to ensure no voltage-related system operating problems.

The hardware optimization thus ensures that the system voltage-related problems do not happen. This, in turn, leads to major efficiency improvements (no need for large margins-of-safety due to uncertain thermal line flow limits). In effect, the present system and method is a way of utilizing a combination of technologies to more reliably respond to the changes in operating conditions seen through SCADA and PMUs, and more accurate thermal line flow limits so that a change from preventive to corrective operations is implemented. Such an arrangement also results in major savings obtained by reducing the need for larger capacity margins than necessary.

The present arrangement integrates a novel Wide Area Situational Awareness (WASA) Module (based on Phasor Measurement Units (PMUs). For example, the WASA module gets its input directly from the state estimator, then the WASA module can simply combine the state estimator output with the corresponding values of the dynamic limits computed by the DLR equipment and provide a complete picture of the system operating status (both actual system conditions and actual system limits at a specific time instant.

Currently, the state estimator is based on SCADA or measurements and processes such measurements utilizing a mathematical model of the power grid and a least-squares estimation algorithm to fit the measurements to the model. Enhancements of the State Estimator have been proposed for utilizing only PMU data if enough data are available) or combination of PMU along with SCADA data.

The ESE proposes the utilization of an enhanced, two-step state estimation approach, which utilizes PIM measurements along with the traditional SCADA data. In particular, the ESE module takes as input the PMU measurements from the PDC and uses a reduced-size equivalent system model. Depending on the redundancy of the available PMU measurements, some additional SCADA measurements may be used. Utilizing these data ESE solves for the system state of the reduced equivalent model. The solution can be based on the same approach as the traditional state estimator least squares fit of the measurements to the mathematical model) or it can be based on a non-iterative state solver. Once a solution is obtained for the reduced equivalent system, this solution of the first estimation step provides "anchor points" for the solution of the solution of the entire system model (second step).

This is expected to improve the performance of the state estimator in terms of accuracy of the results (since the more accurate, time-synchronized PMU measurements have been taken into account) and in terms of performance (faster convergence, less cases of non-convergence). Once the solution is obtained for the entire system the results are sent from the ESE to the WASA, they are combined with the DLR data, as explained earlier, and the combined results, representing the actual system conditions and limits at a specific time, are send to the SS-CEA module. In case the second estimation step, as explained above, does not provide satisfactory results (algorithm might not converge at all so no solution may be provided, or solution might be of low confidence level as per the state estimation normalized residual theory) the results from the estimation at the reduced model can be utilized directly by the SS-CEA module, always in combination with the DLR data and Dynamic Line Rating (DLR) units plus the traditional Supervisory Control and Data Acquisition measurements with an adaptation module, described in more detail below, for optimized adjustments of settings of controllable T&D equipment, power plants, and responsive demand.

Thus the prior art systems have presented WASA based on SCADA which does not determine available capacity accurately. The present combination of SCADA, PMUs and DLRs provides more accurate and synchronized information about the system state.

It is noted that certain advancements in the equipment itself will further the advantages of the present arrangement. For example, faster and more accurate PMUs are expected to improve the overall accuracy and robustness of the state estimators currently used by the industry, while the DLR units, for the first time, provide the ability to more accurately track transmission line thermal limits. The present arrangement takes advantages of such designs to further "close the loop" between the Enhanced State Estimator (ESE) and the Security Constrained Economic Dispatch (SCED) applications for purposes of optimal voltage dispatch. More accurate information about the system state (voltages and equipment status) and about varying thermal transmission line limits is used as an on-line input to the present adaptation module to compute optimal adjustments of controllable equipment.

In one arrangement, the adaptation module utilizes a robust AC Extended OPF (AC XOPF)-based core optimization engine, such as the one developed by NETSS, Inc. (ie. "NETSSWorks") software. Based on the on-line information about the system state (the output of WASA module obtained by combining SCADA, PMUs and DLRs) the software decides on the selection of the most appropriate performance metrics to optimize.

For example, when the grid/system is experiencing relatively low voltages and has line flow limits close to their thermal limits, the adaptation module and software activates its Extreme Voltage Minimization (MXV) module and finds the most effective equipment whose set points should be adjusted in order to bring voltages and line flows within the thermal line flow limits and voltage limits. Alternatively, if the WASA output shows that the reliability state is "normal," namely the system state is within the thermal limits and voltage limits, the adaptation module may select an optimization which increases the efficiency of resource utilization, without endangering reliability (while ensuring no thermal and/or voltage limit violations). The efficiency can be measured in terms of several performance metrics such as delivery losses; ability to minimize total generation cost; ability to accommodate as many renewable resources as possible etc. . . . Such an arrangement can be configured to optimize any of these efficiency-related performance metrics. This choice depends on the regulatory rules for operating the system as a whole.

Applicants note that the adaptation module, its controlling software and internal modules as well as its integration with other components of the system are described in more detail below in the detailed description section and, as shown for example in FIG. 1.

In another embodiment, the present arrangement provides extensive analysis of yearly historical/after-the-fact data that allows for computing the optimal adjustments of controllable equipment off-line, based on the gathered and analyzed historical actual data arriving at the control centers, and for comparison of the non-optimized equipment adjustment that actually took place, to the new, proposed optimized adjustment that would have taken place if such a closed-loop system was in place. Such analysis for example may take place at a rate of 15 minutes to 1 hour.

One of the main challenges, and a major component of the present invention, is to determine where the DLRs and PMUs should be placed in order to make their best use. The present system determines the most likely thermal power line flow limits for the range of operating conditions of interest, or for the anticipated deployment of wind power and/or responsive demand. For example, assume that the basic performance metrics are, in order of importance: (1) MXV for reliability; (2) minimize system generation cost for serving forecast demand; (3) delivery losses, and, (4) maximizing power that can be delivered to the major load centers (e.g. New York City). Extensive simulation experiments must be performed prior to deploying DLRs and additional (to the already planned ones) PMUs to identify key locations for their implementation in order to achieve quantifiable system performance in an order pre-agreed on, so that, assuming the present system is used to process on-line information about the system, the performance objectives and/or their desired tradeoffs are achieved. It is critical to understand that these locations are system-dependent and part of the present invention is a method for computing the best locations on a system-by-system basis. These extensive simulations must be performed over rich set of data, and are generally performed using historical data. However, simulations are also used for anticipated load growth, deployment of wind power, large bilateral transfer contracts, generation mix changes (additions and retiring of plants) and planned changes in T&D systems. Based on these extensive simulations, the best locations for DLRs and additional PMUs are determined.

Potential benefits from using the present system for optimizing grid/system-wide resources are shown as part of several industry projects. They range from loss reduction by more than 50%, through O&M cost reduction during normal operation by 2-5%, and, notably, potential for cost savings due to reliability reserve reduction by 10-20% resulting from optimizing the (N-1-1) reliability requirements. This may translate in $500 million/year savings during normal operation, in for example New York State alone, and estimated savings from 10-20% efficiency for managing reliability of $5 billion/year. Concerning its very tangible benefits, the present invention and its various embodiments may lead to the ability to regulate, for example power factor, by appropriate control of T&D equipment, in an automated way as conditions change as well as to control real power exchanges with the neighboring control areas, again via appropriate control of generation and T&D equipment settings. Simulations are carried out to assess problems and benefits from defining reactive power zones within several different ways (unity power factor vs. reactive power exchanges for minimizing large reactive power loop flows, and the like). These have been some of the major concerns of engineers still employing prior art power grid management arrangements. It is noted that power factor in an area is regulated by adjusting set points of controllable generation and T&D equipment. The present arrangement allows for integrating effects of controllable equipment at the demand (distribution system) side as well.

The system of the present invention is the first of its kind to utilize the on-line other-than-traditional SCADA measurements for more accurate decision making by the system operators. These measurements are particularly relevant for obtaining more accurate estimation of reactive power and voltage values compared to the currently utilized state estimator practices. For example, today's SCADA utilizes redundant measurements of real and reactive power line flows, as well as for real and reactive power bus injections (power generated and withdrawn) as well as voltages at the transmission and sub-transmission system buses. These redundant measurements are processed by the present arrangement's state estimator (SE) to effectively detect bad data measurements and the status of the equipment. Equipment switches in and out regularly within any given power grid, and today's SE is key to observing the actual equipment status. While this is done, alignment of power flow calculations and the SE is checked to minimize the errors between the two and this leads to more accurate voltage and reactive power measurements. The present PMUs and their arrangement at locations along the grid/power lines make the state estimation much more of a manageable and accurate process for a variety of reasons. To this end, Applicants refer to an Enhanced State Estimator (ESE) module as described in more detail below as an enhanced state estimator which would result from a combined use of SCADA and PMUs.

Additionally, it is noted that optimizing voltage settings of T&D equipment and the AVRs on generators requires accurate estimation of voltages and reactive power. Current state estimators are prone to large reactive power/voltage errors. The present arrangement overcomes this serious roadblock on the way to optimal voltage. As described above, given that the transfer limits are often voltage limited, optimal voltage dispatch is a key to improved utilization of the overall resources. The term "optimal voltage dispatch" is contrasted with other AC Optimal Power Flow (AC OFF) art which only optimizes real power generation and assumes voltages to be given. The main novelty of the present arrangement is that it optimizes set points of voltage-controllable equipment (AVRs, PSS, SHCB, SCB, OLTCs, FACTS) in addition to optimizing generation. Many transfers are voltage-problems related, so optimizing selling for voltage controllable equipment eliminates these. Thus one important aspect of the present arrangement is that the arrangement of modules and the software employed, such as NETSSWorks, create more system capacity by optimizing voltages. Notably, some lines which are not thermally limited to start with (when voltage is not optimized) may become bottle-necks after voltage is optimized and this further identifies where DLRs should be placed for even more efficient utilization of the overall thermal capacity, once the voltage limits somewhere on the system were eliminated.

Comparing the results of optimal voltage dispatch with the adjustment decisions by the operators when the operating limits are approached results in the first ever assessment of potential benefits from optimizing the voltage profile on line in the State. The overall benefits are enhanced reliability, increased efficiency by O&M cost reduction, and reduced greenhouse gas effects, and their tradeoffs.

Although the teachings described herein and the corresponding embodiments refer to some specific examples including those relevant to the New York State Power Authority and its related organizations, it can be appreciated by those ski lied in the art that the invention in its various embodiments can be employed and implemented within any power grid structure.

BRIEF DESCRIPTION OF THE DRAWINGS

The present invention can be best understood through the following description and accompanying drawings, wherein.

DETAILED DESCRIPTION

Figure 1:
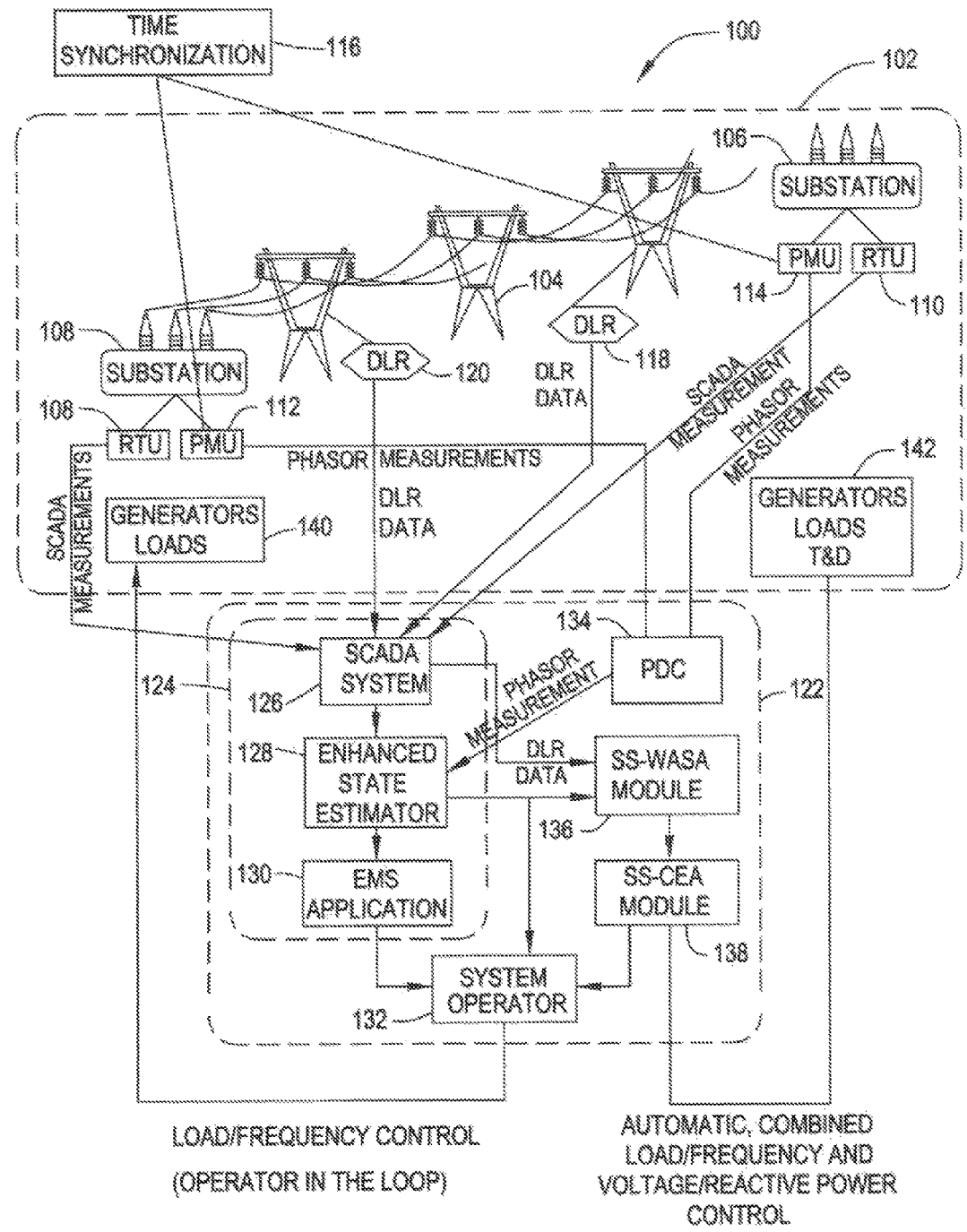
FIG. 1 shows a power grid management system, in accordance with one embodiment.

In one embodiment, the present arrangement provides unique advances in sensing, communications, and computational algorithms for better utilization of the existing and future electric energy assets. In particular, the system builds on the already on-going integration of PMUs and today's SCADA, and the overall effort toward better Wide Area Situational Awareness (WASA). The present system deploys Dynamic Line Rating (DLR) units for estimating actual thermal limits of key transmission lines. The PMU, DLR and SCADA data is integrated into an Enhanced State Estimator (ESE) that forms the basis of WASA. The output of WASA is used by an adaptation module for computing the optimal adjustments of settings on controllable T&D equipment, power plants and responsive demand. Off-line simulations and analysis are carried out to show potential benefits from having better data, as well as from using the data to optimize system-wide control settings as conditions vary. Particular emphasis is on optimal voltage dispatch and the state estimator for providing accurate data for such dispatch.

The complexity created by highly unconventional flow patterns and by their much more frequent variations than in the past makes it impossible for system operators such as the NYISO and/or operators of NYPA and of other Transmission Owners (TOs) to attempt more efficient utilization of the existing resources without being overly concerned about the hard-to-predict reliability problems. The basic idea is to begin to rely on more on-line automation for WASA and for optimizing utilization of energy resources as they continuously change. The present arrangement provides a systematic integration of SCADA-PMUs-DLR units-supported WASA with computationally robust optimization tools and an extended AC Optimal Power Flow (AC) XOPF). An AC XOPF underlies the present software, such as NETSSWorks, and it is capable of adaptively selecting performance metrics that is most adequate use for estimated system damns and it also utilizes a very large range of decision variables (generation, voltage, set points of T&D equipment). This is in contrast with the commercial AC OPF which only optimizes a preselected performance metrics (typically delivery losses) by controlling sub-set of available controllers. Consequently, the AC OPF is always sub-optimal when compared to the AC XOPF.

In accordance with various embodiments of the invention, the present system combines at least the following two separable modules:

1) Steady-State Wide Area Situational Awareness Module (SS-WASA)

This is a PMU-DLRs-SCADA-Based Wide-Area Situational Awareness (WASA) Module, which processes on-line time-synchronized data of voltage and current magnitudes and phase angles as well as system breaker statuses obtained through PMUs and/or traditional, non-synchronized SCADA measurements of voltage magnitudes and power flows/injections and line rating estimates by the DLR units, to advise the operator about the proximity to the power system state limits and/or equipment rating limits. This module advantageously has an enhanced state estimator to generate a snapshot of the current system operating conditions (operating conditions refers to the entire picture of the system (topology, voltages at every location, and currents at every transmission line, transformer, generator or other piece of equipment), along with data received from the DLR units. This information is useful to the operator so that he/she is confident that the system remains reliable and steady-state secure as decisions are made in the second module about optimizing settings of critical controllable equipment.

It is noted that PMU measurements are time-synchronized measurements of voltage and current phasors across the transmission grid. They indicate the operating condition of the power system, i.e. exact voltage level at various locations throughout the system and current flow through various transmission lines in the system. The advantages compared to traditional SCADA measurements are that PMU measurements are synchronized and time-tagged, they are of much higher resolution (typically 30-120 times per second, compared to 1 measurement every 2-6 seconds for SCADA), and they also provide information about the phase angle of the quantity contrary to SCADA measurements, which provide only magnitude. Good PMU measurements are measurements obtained via accurate instrumentation and accurately synchronized via the GPS system. Bad PMU data can be measurements obtained without proper time-synchronization (GPS signal might be lost due to bad reception) or measurements of low accuracy due inaccurate instrumentation. Furthermore, bad measurements may be measurements that are lost or delayed significantly due to problems with the communication link between the PMU and the PDC at the control center and/or traditional, non-synchronized SCADA measurements of voltage magnitudes and power flows/injections.

It is further noted that SCADA measurements are telemetry measurements of voltage magnitudes and active/reactive power injections and flow in the grid. These measurements are not synchronized, neither time-tagged, therefore it is not precisely know when they were taken. The quality of the SCADA measurements depends on the accuracy of the instrumentation and on the communication link between Remote Terminal Unit (RTU) that relays the measurement to the control center.

2) Steady-State Controllable Equipment Adaptation (SS-CEA) Module

This is a PMU-DLRs-SCADA-Based Controllable Equipment Adaptation (T&D, Generation and Demand Side) Module, configured to process the outputs of the WASA module and uses them for deciding how to adjust controllable T&D equipment, as well as generation settings or signals and ultimately demands side consumption, in order for the system to provide the most benefits to its users while remaining steady-state secure. What this means is that the system deploys an optimization tool at a control center that receives on-line data from SCADA, PMU, and DLR units, pre-processed by the WASA module, and, as grid/line/system conditions change, the system computes in real time the key adaptation of steady-state set points on available equipment in order to optimize a set of desired performance metrics. Variations of adjustable equipment are computed depending on which T&D owners and which power plants and load serving entities participate. This adaptation module provides a menu of options for comparison purposes and for identifying which key adjustments are most critical for future participation. This adaptation module could also provide signals indicating missed benefits to different market participants and to the system as a whole if some of the key adjustments are not made, by comparing the actual system behavior with the behavior if the system was optimally operated. Out of the adaptation module comes the resulting performance metrics. This metrics can be computed after optimizing resources using NETSSWorks, on one side, and using power flow/state estimation data to compute the same performance metrics, on the other side. The difference between the two is clearly a quantifiable measurement of potential benefits. This information is for recommending to the policy makers and the market participants to participate in the future and be rewarded for doing this according to the value they bring to the system.

It is noted that SCADA SYSTEM, PDC and STATE ESTIMATOR, all independently refer to existing system components. SCADA is a communications system consisting of remote terminal units (RTU) at the substations that collect measurements from sensors (primarily voltage and current transformers) and send them via communication links to a control center. Each electric utility has its own SCADA system, installed by a specific vendor. PDC is a computer running software that collects input data from multiple PMU and combines them all together and produces a single output with all the data, so that these data can be processed by other applications, STATE ESTIMATOR is a program that gets raw data from SCADA (and also the PDC) and processes/filters them using a model of the power system and some processing algorithms and provides a more accurate/filtered version of the system data that can be presented to the system operator or used for other energy management system (EMS) applications. The exact architecture for all these systems depends on the specific implementation.

Turning to exemplary FIG. 1, this figure shows a power management system (designated by the outline 122 in the context of managing a power transmission line/gird (designated by the outline 102) according to the present arrangement in both a closed loop option as well as in an operator-in-loop arrangement.

Transmission System 102 has:
    Substations 106, 108
    Generators, loads 140 (or automated closed loop version 142)
Detectors Installed Along Transmission System 102 Include—
    DLRs 118 and 120 CAT-1™ dynamic line rating/sag monitor equipment)
    PMUs 112 and 114 (time synchronization 116)

RTUs 108 and 110

The Present System for Monitoring Transmission Line 102 Includes

SCADA system 126

PDC (Phasor unit) 134

State estimator or enhanced state estimator 128

EMS applications 130

System operator 132

Where the Present Arrangement Further Includes

SS-WASA module 136

SS-CEA (adaptation) module 138

Figure 2:
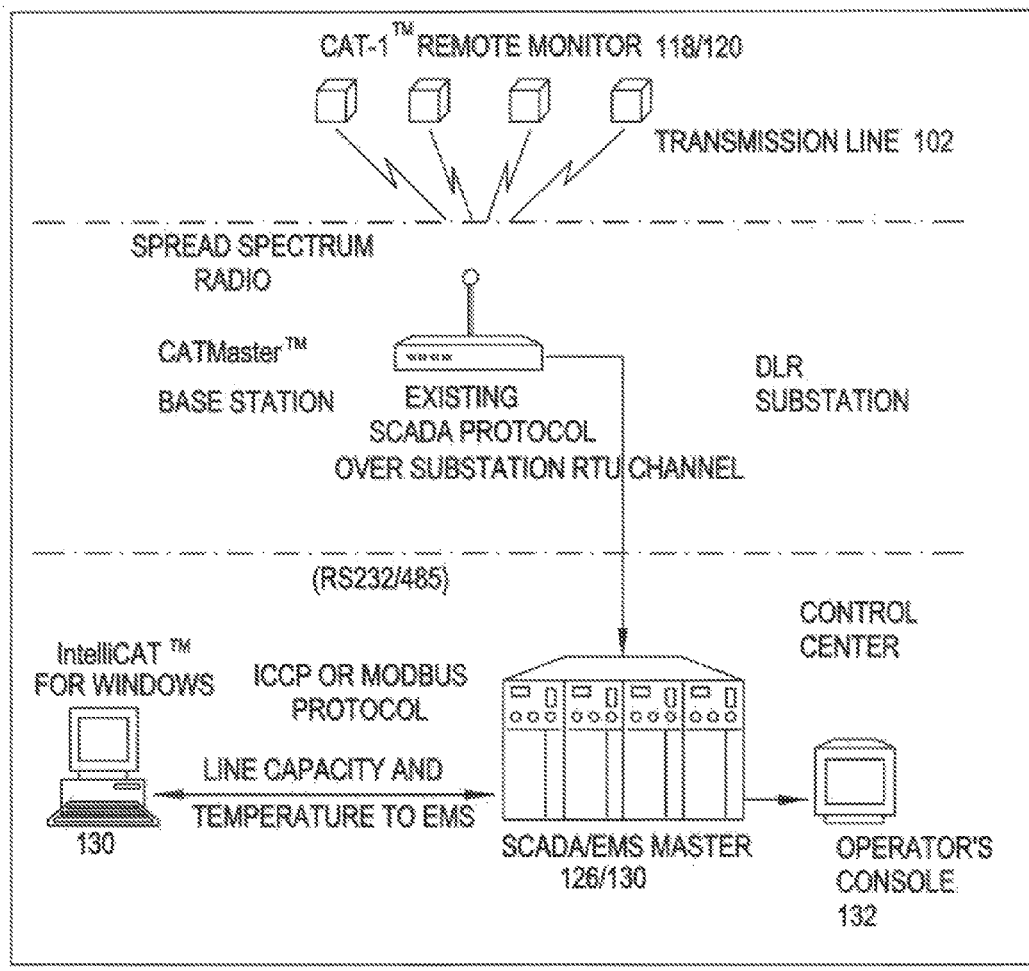
FIG. 2 shows an example DLR arrangement, in accordance with one embodiment.

It is noted that the functions of the various detection modules, such as DLRs and PMUs as well as the function of both WASA module 136 and adaptation module 138 listed above have been described in detail throughout the summary and detailed description sections of this application, with such descriptions applying to, in particular, SS-WASA module 136 and adaptation (SS-CEA) module 138. It is noted that the number of modules shown and the position relative to one another in FIG. 1 is exemplary and other arrangements, combinations of units, separation of units, are equally contemplated. FIG. 2 shows an exemplary connectivity between the DLR units (e.g. 118, 120) and the SCADA module 126.

Figure 3:
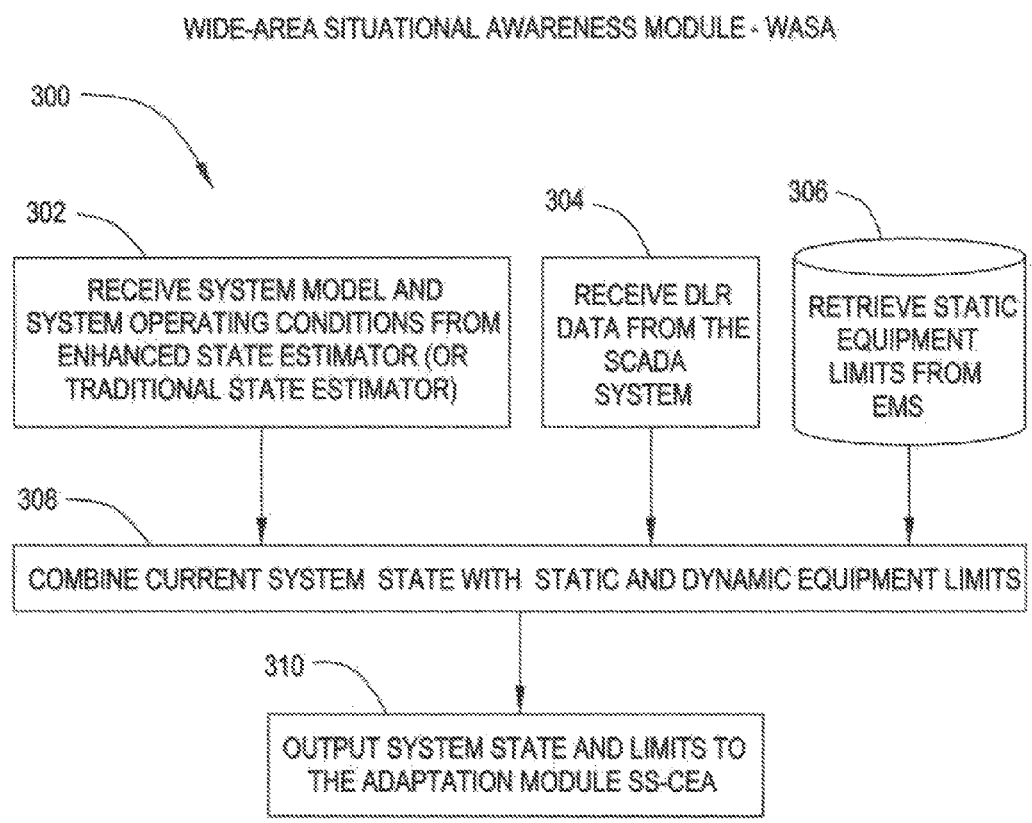
FIG. 3 shows an exemplary flow diagram for a WASA module of FIG. 1 in accordance with one embodiment.

Regarding the operation of WASA module 136, FIG. 3 is an exemplary flow chart 300 showing the operation of WASA module 136 in the context of FIG. 1. In a first step 302, WASA module 136 receives system model and system operating conditions from enhanced state estimator (or traditional state estimator). Next, at step 304, WASA module 136 receives DLR data from SCADA system 126.

At step 306, WASA module 136 retrieves static equipment limits from EMS database 130. Next, at step 308, WASA module 136 combines current system state with static and dynamic equipment limits and finally, at step 310, WASA module 136 outputs system state and limits to Adaptation Module 138 to be further processed as per FIG. 4 and the accompanying description.

The above described steps for WASA module 136 are considered exemplary and are in no way intended to limit the scope of the present arrangement. Modifications, changes, combinations and separations of the various steps are also contemplated, particularly within the context of the relevant complimentary discussions within the present specification.

Figure 4:
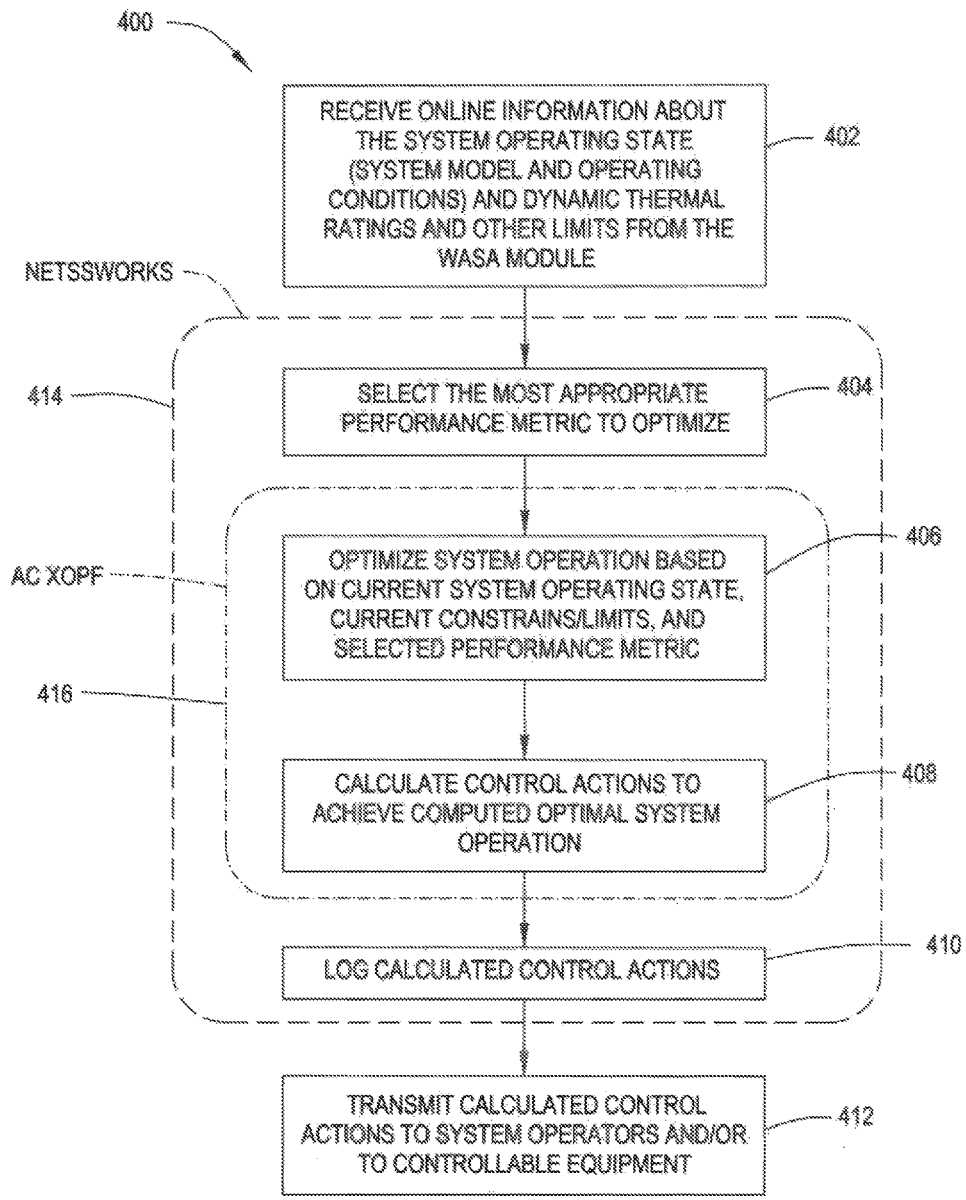
FIG. 4 shows an exemplary flow diagram for an adaptation module of FIG. 1 in accordance with one embodiment.

Turning to adaptation module 138, FIG. 4 is an exemplary flow chart 400 showing the operation of adaptation module 138 in the context of FIG. 1. In a first step 402 adaptation module 138 receives online information about the system operating state (system model and operating conditions) and dynamic thermal ratings and other limits from WASA module 136. Then, at step 404, adaptation module 138 selects the most appropriate performance metric to optimize.

At step 406, adaptation module 138 optimizes system operation based on current system operating state, current constrains/limits, and selected performance metric. At step 408, adaptation module 138 calculates control actions to achieve computed optimal system operation. Log calculated control actions occur at step 410 and finally, at step 412, adaptation module 138 transmits calculated control actions to system operators 132/140 and/or to controllable equipment 142.

It is noted that the above steps 404-410, outlined as item 414 occur within the framework of the exemplary software, such as NETSSworks discussed in detail throughout the application, operating on adaptation module 138. Likewise, steps 406-418, outlined as item 416 occur within the framework of the exemplary optimization tools and an extended AC Optimal Power Flow AC XOPF discussed in detail throughout the application, operating on adaptation module 138.

The above described steps for adaptation module 138 are considered exemplary and are in no way intended to limit the scope of the present arrangement. Modifications, changes, combinations and separations of the various steps are also contemplated, particularly within the context of the relevant complimentary discussions within the present specification.

Having described the basic components of transmission system 102, the monitoring equipment and present system shown in box 122 of FIG. 1, the remainder of the application discusses various advantageous features of embodiments of the invention as well as certain specific exemplary implementations and benefits of such implementations to further detail the salient of the present arrangement.

On-line Selection of Performance Metrics—

A first feature of the present arrangement concerns a basic underlying concept that maximizing transmission system utilization and accommodating larger renewable and intermittent energy sources at an acceptable cost and without diminishing reliability, but rather enhancing it, requires careful adaptive selection of performance criteria as conditions vary. Sustainable clear services imply careful balancing of different objectives as conditions nary. A discussion of how selection of different objectives must be conducted to make the most out of the available transmission assets and energy resources is explained below.

On-Line Selection of Most Critical Adaptation—

A second feature of the present arrangement is to carefully perform the adaptation over all possible controllable variables as new data becomes available in real-time:

1) settings of variable T&D equipment, such as Under-Load Tap Changers (ULTCs), which are transformers capable of adjusting their transformation ratio while in operation, Capacitor or Reactor Shunts, which passive devices controlled via switches and used to regulate voltage and provide reactive power support by injecting or absorbing reactive power to/from the system in a fixed or discrete way, Phase Angle Regulators (PARs), which are transformers with (close to) unity transformation ratio that are used to control active power flow by creating a phase-angle difference between their primary and secondary windings, Static VAr Compensators (SVCs), which are essentially shunts that are controlled via power electronics-based switches allowing a smooth, continuous type or reactive power injection (compared to the regular shunts), Static Synchronous Compensators (STATCOM), which are voltage regulators based on power electronics voltage-source converters and can act as either a source of sink of reactive power, DC lines;

2) generation settings, both real power scheduling and settings for the Automatic Voltage Regulators (AVRs), which are the subsystems of generating units that control the generator terminal voltage and reactive power; and 3) demand adjustments where most appropriate.

On-Line Coordination of Decisions by the ISOs, such as the NYISO and the TOs—

A third feature of the present arrangement concerns a more streamlined coordination of the adaptation of equipment between an ISO, such as the NYISO, and the TO, power authorities such as the NYPA in particular and control centers. For example, during normal operation, NYISO may broadcast system conditions for the next hour to all TOs, including likely tie-line flow exchanges and/or emergency outages. The TOs periodically update their equipment limitations and status changes, if any. The NYISO, in turn, optimizes the system based on the system-wide criteria, and determines the settings for T&D equipments and communicates to the TOs to adjust those key settings. This streamlined on-line interaction between the NYISO and the TOs begins to form the basis for a key function of Smart Grid within the NYISO. The data flow from the present arrangement as shown in FIG. 1 enhances the coordination between the ISO and the TOs, as data flows from the TOs to the ISO, then information after processing flows from the ISO back to the TOs, and also some control actions are decided by the ISO but need to be implemented by the TOs.

A fourth feature of the present arrangement concerns closing the loop between sensing equipment (PMUs and DLR units), WASA 136 and adaptation 138 modules. In this context, "closing the loop" is done on-line as new SCADA 126, PMU 112, 114 and DLR 118, 120 inputs arrive. All but sub-modules perform their own calculations (SE, ESE, New Thermal Limits) and this is fed to WASA module 136. Output of this module is input to adaptation module 136. Once the computations are done for new set points of adjustable equipment in the adaptation module 136, these signals are sent to the main control center either as advisory signals to the operator or, alternatively as automated commands to the power equipment to reset the ET points. If this is done as advisory signals to an operator such as system operator 132/generator equipment 140 as shown in FIG. 1 this is done to ray ice their effective management of their transmission system 102. Alternatively if the above paragraph is performed as a closed-loop, automated commands are sent directly to controllable power equipment, such generators 142, to reset the ET points, thus directly enhancing the effective management of transmission system 102.

In either case, since critical equipment requires adjustments/changes over time, it is necessary to have sufficiently complete information about the critical systems states. This means that different PMU inputs would be more or less critical as conditions change, but notably, one would require lots of synchronized data.

There are basically no carefully designed alternate industry solutions in the prior art. This is the first method for closing the loop between T&D controllable equipment, SCADA, PMUs and DLR units with the optimizer—i.e. adaptation module 138, capable of selecting both the most effective performance metrics (such as most economical system operation, minimization of transmission losses, minimization of emission, maximum utilization/penetration of renewable energy, maximization of hydro penetration, etc. . . . ) and the best adaptation of controllable equipment as system conditions change. All other prior art approaches known are a long way from even beginning to cope with the conflicting objectives encountered (e.g. choosing to maximize utilization of available wind might be conflicting with loss minimization, or maximization of hydro penetration; or the most economical system operation might be conflicting with emissions minimization, depending on the actual system under consideration).

As noted in the background section, today's objectives of power/grid system operators are predominantly targeted to ensure worst case secure operation even for the worst-case equipment failures (N-1, N-2 reliability criteria), and this often precludes efficient utilization of resources by adjusting critical equipment settings in an on-line manner even during the equipment outages which are not time critical (therefore only claim on steady state).

Off-line Studies for Determining Optimal DLR Unit Locations and Optimal T&D Equipment Adjustments to Ensure Reliable, Efficient, and Clean Operation in the NYISO System—

In accordance with one embodiment of the invention, in order to optimally place the DLR sensor and measuring equipment, the main objective of this task is to perform extensive simulations and analyses using large amounts of historical data to develop statistical patterns concerning most likely thermal limits over the range of loading conditions, contingencies and wind power outputs.

Historical Data Gathering and Organizing as an Adaptive Module Input—

In order to select the best ions for DLR units and to use these with high confidence fun coordinated equipment adjustments it is necessary to carry out an-in-depth analysis of transmission system conditions using data for at least one year to accommodate power usage over various seasons. This captures the representative loading and generation patterns, in particular. It is necessary to create an experiment to analyze the probabilistic effects of equipment failures on the results as well. Such an historical data gathering may be used to minimize the impact of losing a piece of equipment; if the probability of equipment malfunctioning is high it may be desirable to place redundant pieces of equipment of a line that is very crucial and you would not want to lose DLR data from that line. Depending on the failure probability and on the desired level of confidence you might want to have multiple redundancies.

Moreover, it is advantageous to relate the selection of different performance metrics to the selection of best locations for DLR units and for the optimal T&D equipment adjustments. Finally, as different wind power plants get deployed, conditions will become less predictable and it will become important to better monitor the lines most critical for utilizing wind power when available.

In one arrangement, filtered periodic state estimation data in PSS/E format may be used for every 15 minutes. This refers to the connection between the state estimator 128 and WASA module 136. At specific time intervals, which can be every 15 minutes or even faster as technology advances a "snapshot" of the system conditions is transferred from state estimator 128 to WASA module 136, combined with the updated DLR data and then this information is send to adaptation module 138 which then performs the optimization and the computation of the optimal control schemes as noted in FIG. 4. Then this computed control signal for example may be then fed back to the system controllable equipment 142, closing the loop.

The present system may also be used for the genera on and demand bid functions for the same time interval; results of bid clearing by the NYISO electricity market in the PSS/E format; and results of system operators' (e.g. NYISO and NYPA) actions for the same period taken to make bids cleared by the market meet reliability criteria. This arrangement allows interfacing the system operation with markets and performs the analysis documenting potential benefits.

Determining Best Locations for DLR Units—

Particular new emphasis is to use a power management software system, such as the exemplary NETSSWorks software used in adaptation module 138, to assess the effect of transmission line limits on the system ability to integrate more wind. The sensitivity of various aspects of system cost (reliability, O&M cost, environmental impact, etc. . . . ) with respect to line flow limits is used to decide the best lines to monitor in order to enable the system to accommodate wind power outputs 15 minutes as these become available in the future. PMU data may be used as they become available in the system to ensure the accuracy of state estimation results, in particular, with respect to reactive power and voltage measurements. However, this task can also be carried out using well-organized time-stamped historical data. Once the key lines in a system are determined, the DLR equipments are installed.

Having described some of the potential advantages of implementing the various embodiments of the present arrangement, the following provides some exemplary implementation of some of the various features of the present invention. In some cases trade names are used for the various equipment pieces as would be generally recognized in the industry.

At Selected Dead-End Structures—

Supply line hardware and structure mounting hardware need to be deployed at various locations determined by the present system. Thereafter, it is necessary to mount and align line-of sight Yagi antennas. Next, it is necessary to install Load Cells in one phase of transmission line. Thereafter, NRS is mounted on bracket supplied and align with conductor. CAT-1 and CATPAC are mounted with solar panels on selected structures. (Standard-length Cables with mil-std type screw connectors supplied with equipment. Route and secure to structure.) NRS refers to Net Radiation Sensor, a piece of equipment that measures solar radiation. This is one of the measurement is used by the DLR equipment to eventually provide a calculated line thermal rating. Load Cells, antenna, NRS, ambient temperature sensors and CATPAC cables are connected to CAT-1 using color-coded screw connectors. Solar panels are connected to CATPAC and power batteries are installed.

At Selected Repeater Structures—

For each repeater structure, line-of sight 2-Yagi antennas are mounted and aligned. Thereafter, CATPAC is mounted with solar panels on selected structures. CATPAC cables are connected to antennas. (Standard-length ½" helix Cables and connectors supplied with equipment. Route and secure to structure.) Solar panels are connected to CATPAC and thereafter batteries are installed At Remote Terminal Unit (RTU)—Location (Substation or Microwave Station)—

For each RTU location, a CATMaster is installed in standard 19" rack (2 RU High) and is connected to 125 VDC or 120 VAC, 25 W power source. Antennae at the substation installed and aligned. Data point definitions (12 per CAT-1) are then programmed into SCADA. Radio path and signal strengths are then verified. Receipt of 12 bi-polar analog data points per CAT-1 is also verified.

At Energy Management System (EMS) Server Room (Data Collection and Processing Point)—

(See for example, modules described in FIGS. 1 and 2) At EMS server room 130, each server in Rack is installed and connected to data cable and 120V Power Supply. Pin-out at EMS/SCADA Connector (9 pins) is programmed. Licensed ICW for Windows™ software is installed. Licensed AXS-4-ICCP™ software is also installed. Thereafter, I/O points are mapped. Communications are verified. Pre-programmed INI files (containing line geometry & CAT locations) are installed and ratings and alarm status logic is verified. Similarly, STE and post-contingency time limit options are verified.

At Energy Management System (EMS) Operations Center 130 (HMI Display design and programmed) ratings display(s) are verified. Alarm Screen display is verified as well.

Note that while hot installation of DLR is possible when transmission owner's safety standards permit, an overnight line clearance is recommended as it is foreshorten calibration Minimum of 4 hours cools down before calibration if line is fully loaded.

Exemplary—Power Supply Requirements—

CAT-1 Remote (DLR's 118, 120) are battery operated with solar panel charging, CATMaster at substation: 25 Watts @ 120 VAC or 48 VDC or 125 VDC. Field calibration is performed during the installation outage and data is archived on a system server. This procedure is followed again, remotely in an opposite season (6 months later) via File Transfer from archived data. (No outage required).

Off-Line Implementation and Data Accuracy Testing of the WASA and Adaptation Modules—

Communication equipment are installed and tested to link the information coming to and from as many modules as possible indicated in FIG. 1.

Installing IT Infrastructure—

Adequate communications links are deployed, where existing communication links are not in place. In particular, the communication of data is established between the DLR units 118, 120 and WASA module 136 as well as the local integration of adaptation module 138 at control center 132.

In order for the WASA and adaptation modules 136 and 138 to be used in synchrony, it is necessary to work on processing data which will arrive at different rates. For example, the PMU data from PDC 134 arrives at much faster rate than the traditional SCADA data and the data from the DLR units. The core of WASA module 136 is based on existing EMS applications and on the outcome of work being performed as part of other currently active projects for PMU 112, 114 deployment and PMU data utilization.

Testing the Accuracy of the Enhanced State Estimator—

In accordance with one embodiment, the accuracy of voltage and reactive power data in state estimator is tested. It is known that error residues of today's state estimators are large when it comes to estimating voltages and reactive power flows. For purposes of the invention it is advantageous to ensure high quality reactive power and voltage data, in addition to other data. The accuracy of the voltage state estimator is simulated and tested. If needed, an enhanced voltage state estimator is deployed. The estimator utilizes qualitatively different algorithms from the ones currently used in control centers. Finally it is advantageous to build and ensure that the off-line WASA infrastructure is in place and to test that sufficiently accurate data are communicated to adaptation module 138 so that tasks can be carried out.

On-site Off-Line Data Gathering, Simulations in the Adaptation Module and Comparison of Results to the Current Operations and Planning Practices—

A setup is provided for using data as it becomes available for analyzing, sending signals to WASA module 136 about possible problems on transmission system 102, and making the information available to system operators 132 in an advisory way about what may be the effective equipment adjustments. In accordance with one embodiment, the results may not be used on-line, but every effort will be made to proactively collect, archive data as well as the results of the analysis.

On-Site Off-Line Simulations and Analyses—

Assuming that the identified lines are equipped with DLR/PMU units, on-site off line simulations are to assess potential benefits in operations planning, and, ultimately, in near real-time operations.

Comparison of System Performance with and without the WASA/Adaptive Modules—

An extensive comparison is done to learn the differences and their impacts on system performance. The installed framework performs much better as it utilizes an embedded optimizer.

Comparison of System Performance with and without DLR Unit Data—

A comparison of system performance with and without DLR units is performed. Of particular interest is the quantification of potential benefits brought about by the installation of DLR units. Basic estimates of potential benefits from coordinating voltage controllable equipment while dispatching real power generation have been reported in several reports. The studies up to date have used only representative test cases and this does not account for load variations with time. However, based on work to date, the resulting benefits are both short-term (O&M) and long-term (better asset utilization) savings as follows:

Additionally, an important benefit from managing non-time-critical contingencies by adjusting other equipment on-line instead of requiring standby reserve for the worst case scenario is on the order of 10-20% savings of total generation cost needed to meet demand in reliable ways, amounting to billions/year in a state like New York.

On-line adaptation, in support of intermittent wind and solar power, for example, is likely to reduce cost of balancing wind at the similar order of 10-20% of the total O&M cost. This essentially means that utilization of wind is facilitated without excessive cost increases or reliability threats. This can be achieved simply by switching from preventive worst-case operating practice to ensuring (N-1-1) reliability criteria by optimizing key controllable equipment in between two contingencies. A more adaptive approach to also managing (N-1) reliability in a corrective manner at least for non-time critical contingencies could lead to even higher savings. Managing intermittent resources in a preventive way requires approximately 10-15 minutes ahead of time wind accurate forecast, which has been demonstrated to be doable.

At least one of the goals of using the output of phasor measurement nits (112, 114) and that of dynamic line rating devices (118, 120) in real time is to enable operator 132 to run the grid 102 optimally and with enhanced reliability and wide area situational awareness (WASA). The present arrangement provides operations 132 staff with a broader understanding of both electrical and physical capabilities of the electric system 102 in real time allowing reaction time to adverse system contingencies and constraints. This type of situational awareness increases reliability and allow greater flow of renewable resources on existing assets.

Reduction in utilization of fossil plants through the increased use of renewable resources is another potential benefit. Although difficult to quantify, it is intuitive that by allowing increased flow on the existing assets, it allows additional flow of the large quantities of renewable assets, while reducing green house emissions through reduction of utilization of fossil plants within the system. Other benefits include such as knowing the transfer capacity of the transmission line in real time; and, determining the "Next Limiting Element".

Additionally, the combined framework to utilizing on-line estimation of transmission line thermal limits using DLR units and using this information for optimized equipment adjustment lends itself to an important opportunity for increasing interface limits within a power system. Namely, since often the limiting factor is voltage constraint and/or inability to balance reactive power (no solution to AC power flow) a two-stage approach is taken in which:

1) for any given system state the voltage controllable equipment is adjusted first to overcome the first limit and enable more power transfer, leading to potential thermal limit violations; and
2) amore accurate information about the thermal limit of likely limiting lines due to higher transfer provided by the DLR units is used to utilize as much as possible the existing lines. Such procedure increases power transfers significantly and has major benefits.

Additional Technical Details—

On-Line Selection of Performance Metrics—

The PMU, DLR, SCADA-Based Controllable Equipment Adaptation Module internally selects the most appropriate optimization criteria depending on the transmission system conditions detected by the PMU, DLR, SCADA-Based WASA Function. For example, if WASA Module 136 detects very close proximity to the system voltage constraint limits, such as excessively low or high voltages, adaptation module 138 may automatically select the optimization criteria to correct extreme voltages; whereas if data coming from WASA module 136 indicates that the states are well within their limits (normal condition, even if there is some equipment out of service) adaptation module 138 may select the optimization criteria such as minimizing total economic dispatch cost, or maximizing transfers for economic reasons, or minimizing transmission losses. Here, again, additional logic is used to select the criteria that lead to the most benefits in terms of economic savings given the conditions. Finally, depending on how are the Regional Greenhouse Gas Initiative (RGGI) or potential future cap and trade requirements are specified (on longer term annual basis, or daily) there is an additional layer for selecting other optimization criteria such as balancing cost (efficiency) and greenhouse effect emissions.

Here, again, the system provides a function internal to the Adaptation Module to carefully balance system reliability, cost, and efficiency as system conditions change.

On-Line Selection of Most Critical Adaptation—

Another feature of the present arrangement is to carefully perform the adaptation over all possible controllable variables as new data become available in real-time:

1) settings of variable T&D equipment, such as shunt capacitors or reactors, PARs, SVCs, STATCOMs, DC lines;
2) generation settings, both real power scheduling and settings for AVRs; and
3) demand adjustments where most appropriate.

Demand side adjustments can be done either for economic reasons in the case of price-responsive demand, and/or through load shedding (direct load control) for maintaining system integrity and ensuring that the system is reliable even under extreme contingencies. Carefully selected key adjustments often meet the performance objectives in a significant way. It is like that the remote sensing and control of set points of currently not automated T&D equipment needed to reach the highest benefits at the cost that does not exceed the benefits.

On-Line Coordination of Decisions—

As discussed briefly above, another feature of the present arrangement concerns a more streamlined coordination of the adaptation of equipment between the Power Systems Operators such as NYISO and the Transmission Owner control centers. For example, during normal operation, NYISO would broadcast system conditions for the next hour to all TOs, including likely tie-line flow exchanges and/or emergency outages. The TOs periodically update their equipment limitations and status changes, if any. The NYISO, in turn, optimizes the transmission system based on the system-wide criteria, and determines the settings for T&D equipments and communicates to the TOs to adjust those key settings. This streamlined on-line interaction between the NYISO and the TOs begins to form the basis for a key function of Smart Grid within the NYISO. The frequency of this optimization depends on several factors. For steady-state or quasi-steady-state operation minutes time frames may suffice. In emergencies, NYISO would first take necessary action to maintain system integrity and optimization function is deferred until the system is back to normal operation, Off-Line Testing of Closing the Loop Between WASA and Adaptation Modules—

Another feature of the present arrangement concerns closing the loop between sensing equipment (PMUs and DLR units), WASA and adaptation modules 136 and 138. Closing the loop between on-line measurements and actuation for adaptation and near real-time control in support of a reliable and economical and sustainable electricity service is proposed for the first time. There are basically no carefully designed alternate industry solutions. The present system uniquely provides an arrangement for closing the loop between T&D controllable equipment, SCADA, PMUs and DLR units with the optimizer capable of selecting both the most effective performance metrics and the best adaptation of controllable equipment as system conditions change. As noted above, all the other prior art approaches are a long way from even beginning to cope with the conflicting objectives encountered.

Having discussed the present arrangement, and its various advantages aver the prior art, and having already discussed some technical details for exemplary implementations of the present system, the following is an additional description of exemplary technical implementation details of at least one embodiment of the present system. It is noted that in the following discussion, and in much of the description above, many of the examples relate to New York State and various entities and systems of their state power grid. This is for exemplary purposes only and if in no way intended to limit the scope of the invention. The present arrangement as described in this application may be used in the management of any power transmission system, either state or private.

Description of Dynamic Line Rating Equipment—
Overview—

As illustrated in FIG. 2, a CAT-1™ System (e.g. DLR's 118, 120) is fully integrated into NYPA's EMS System (FIG. 1). The integration results in system operators receiving Dynamic Line Ratings and clearance warning alarms on their existing consoles in the central control center. The Dynamic Line Ratings is also available to all personnel and any application programs having access to the EMS system (NETSS, state estimators, contingency analysis, planning, engineering, etc.).

As shown in FIG. 2, CAT-1™ Remote Monitors are installed on dead-end structure to monitor conductor tensions and net radiation temperatures on carefully preselected line sections. Each CAT-1™ Remote Monitor transmits its data by spread spectrum radio to a substation. A receiving unit (CATMaster™) at the substation translates the data from the CAT-1™ Remote Monitors into the EMS's RTU protocol and delivers the data to the EMS. For all practical purposes, the CATMaster™ looks exactly like an addressable RTU to the EMS master. The EMS delivers the CAT-1™ data plus line ampere data via ICCP protocol to a server PC running ICW (IntelliCAT™ for Windows) software. The ICW software generates real time line ratings and clearance warnings and returns them to the EMS database via ICCP protocol. The ratings and clearance warnings are then be displayed on the operator's existing console. ICW also logs all essential data and results for subsequent analysis.

System Component Descriptions—

The following is a brief description of the major system components and the corresponding components as described in more detail in relevant product data sheets described at http://www.cat-1.com, incorporated herein by reference.

Structure Instrumentation—

CAT-1™ Remote Monitors are installed at selected dead-end structures to monitor net radiation temperatures and conductor tensions on the two line sections terminating at each dead-end structure. A CAT-1™ Remote Monitor consists of one CAT-1™ Main Unit, one CAT-PAC™, two tension monitoring Load Cells, and two Net Radiation Sensors. The CAT-1™ Main Unit provides local control, data acquisition, and spread spectrum radio communications for the structure instrumentation. The CAT-1™ Main Unit is housed in a weather proof NEMA enclosure and is mounted at a convenient height on the structure. The CAT-PAC™ provides temperature compensated solar power for the structure instrumentation with sufficient battery capacity to permit operation for up to one week with no solar charging. The CAT-PAC™ is housed in a weather proof NEMA enclosure and is mounted at a convenient height on the structure.

The Net Radiation Sensors measure the net impact of ambient temperature and solar radiation on the conductor. They are installed on the structure at the average height of the conductor. Stainless steel Load Cells measure the conductor tension on one phase of each of the two line sections terminating on the structure. They are installed on the "cold side" of the dead-end insulator strings—that is, they are located at ground potential between the structure and the insulators.

Each CAT-1™ Remote Monitor communicates with a CATMaster™ Base Station via spread spectrum radio. Radio range is nominally 20 km, but varies with local conditions (e.g. terrain). Solar powered spread spectrum radio repeaters are available for longer communication distances.

CATMaster™ Base Station

The CATMaster™ is a 19 inch (483 mm) rack-mount unit that acquires data from up to four CAT-1™ Remote Monitors via a spread spectrum radio transceiver. The data is then translated into the EMS's RTU protocol and transmitted to the EMS. For all practical purposes, the CATMaster™ looks exactly like an addressable RTU to the EMS muster.

The CATMaster™ provides a RS232/485 port for EMS communications. The RS232/485 port may be connected to a customer-supplied modem, or to an RS232/485 port on a local intelligent RTU, whichever is preferred. The CATMaster™ is capable of supporting IEC 870-5-101-05, DNP 3.0, or MODBUS protocols.

IntelliCAT™ Real Time Rating Software—

ICW provides a fast and easy way to integrate a real-time transmission line rating application into an EMS without the need to develop, debug, support, and maintain a custom EMS application. A detailed description of ICW is available at http://www.cat-1.com and is incorporated herein by reference.

ICW is designed to run as an application on a supplied server, such as the one provided by TVG, Nexans running Windows NT, 2000, or XP PC, Pentium 3 or better, minimum 1 Gb RAM, minimum 300 Gb available hard drive space. In addition, the PC must be connected to the EMS ICCP network.

ICW rates each of the monitored line sections independently, and then selects the lowest of the ratings as the overall line rating to be reported to the system operator. The individual line section data is logged for future engineering analysis. The proposed ICW includes dynamic alarms alerting the system dispatcher to converging real time ratings and load (or predicted post contingency current from the EMS's security analysis programs).

In accordance with our embodiment there are two transient response modules identifying:
  (1) the maximum post contingency current that can be sustained for a period of 15 minutes without exceeding the maximum permitted conductor temperature [Short Term Emergency Rating] and,
  (2) the time remaining until the maximum permitted conductor temperature is reached following a contingency eve As-Built Line Analysis—

To accurately calculate real-time line capacity, conductor temperature, and sag, the line sections being monitored are carefully analyzed to determine the line section's operating characteristics "as built" versus "as-designed." ICW software automatically logs system data files which are periodically sent a DLR group via disk or email. Upon completion of analysis, the DLR operator delivers an updated system calibration file which is used by ink to generate real-time ratings.

This process is repeated at least three (3) times over a one-year period. The first analysis provides an initial calibration based on outage data collected during installation. The second analysis is done to confirm the initial calibration using a larger data set collected 30 to 60 days after installation. The third analysis is done several months later (during the opposite season) to confirm that the line has been properly modeled across all temperature ranges.

Onsite Technical Direction—

A DLR operator field engineer provides technical direction related to the installation and commissioning of all CAT-1™ System components. The technical direction is provided prior to being onsite and while onsite. The field engineer acts in an advisory capacity, suggesting methods and procedures that will both simplify the installation and ensure its proper functioning as a system.

Off-line Studies for Determining Optimal DLR Unit Locations and Optimal T&D Equipment—

Adjustments to Ensure Reliable, Efficient and Clean Operation in an Exemplary System Such as the NYISO System—

A main objective of this task is to perform extensive simulations and analyses using historic or after-the-fact data to develop statistical patterns concerning most likely thermal limits over the range of loading conditions, contingencies and wind power outputs. The analysis includes assumed loads and preselected conditions. It has been found that an overly simplified approach to assessing the most likely transmission lines to be overloaded is not effective. In particular, it has been found that it would be highly unrealistic to only perform contingency screening using linearized DC analysis tools such as the ones currently used by the NYISO (MUST, in particular), since these tools lead to overly optimistic assessments of what the NYISO system can do in reality in particular, it has been found using AC XOPF that the first limits are voltage violations outside the NYISO (PJM, in particular). AC XOPF is used to adjust voltage limits outside NYISO by adjusting the controllable equipment in RIM. Once this is done, the transfer limits of typical interest within NYISO become constrained by voltage violations interim NYISO (generators and T&D equipment, or just generators. It is only when voltage support is implemented based on the results of running AC XOPF that the interface limits can be increased substantially, and the real power line flow limits begin to approach their thermal limits. This is true of transmission lines whose voltage is 230 kV and higher. Throughout the analysis there are several 115 kV and lower voltage lines whose thermal limits are reached. In preparation of this application, NYPA lines were chosen to simplify the process of obtaining approvals for the installation of the DLR devices.

In order to select the best locations for DLR units and to use these with high confidence for coordinated equipment adjustments it is necessary to carry out an-in-depth transmission analysis of system conditions using data gathered over a period of time. This would capture the representative loading and generation patterns, in particular.

It is also advantageous to consider the potential savings during storm-watches by the NYISO. It is important to more accurately know what particular key lines can transfer in order not to drastically reduce the transfers. Very careful statistical analysis of contingencies, the probability of their occurrences and their likely impacts are done in order to reach the best benefits.

Furthermore, as different wind power plants get deployed, the conditions will become much less predictable and it will become important to better monitor the lines most critical for utilizing wind power when available. This, again, is not a single scenario, as patterns may vary significantly with weather conditions.

At least some of the desirable time-streamlined data are:
  Filtered state estimation data in PSS/E format for every 15 minutes;
  Generation and demand bid functions for the same time interval;
  Results of bid clearing by the NYISO electricity market in the PSS/E format; and
  Results of system operators' (NYISO and NYPA) actions for the same period taken to make the bids cleared by the market meet reliability criteria observed.

Of particular consideration is to use this software to assess the effect of transmission line limits on the system ability to integrate more wind. The sensitivity of various aspects of system cost (reliability, O&M cost, environmental impact) with respect to line flow limits is used to decide the best lines to monitor in order to enable the system to accommodate wind power outputs 15 minutes as these become available in the future. PMU data is used as they become available in the NYISO system to ensure the accuracy of state estimation results, in particular, with respect to reactive power and voltage measurements. This task could also be carried out using well-organized time-stamped historical data from the traditional SGADA system.

Off-Line Implementation and Data Accuracy Testing of WASA and Adaptation Modules 136 and 138—

Equipment is installed, to link the information coming to and from all modules indicated in FIG. 1. To start with, work might be needed to deploy adequate communications links where these are not in place. The NYISO DoE SGIG project dedicated to the installation of PMU units in the NYS transmission grid is a synergic effort in this direction along with the NYSERDA project for the support of development of a synchrophasor network.

The accuracy of voltage and reactive power data in today's state estimator is tested in accordance with one embodiment of the invention. It is known that error residues of today's state estimators are large when it comes to estimating voltages and reactive power flows. For purposes of the present invention it is essential to ensure high quality reactive power and voltage data, in addition to other data.

Two types of data are collected by WASA. Slower-rate data is used by adaptation module 138 for steady state adjustments of the settings on controllable equipment as load forecast is made 15 minutes ahead of time, or so. This data is fed to adaptation module 138 along with actual line ratings coming out of the DLR units and post-processing the fast PMU data. Adaptation module 138 uses synchronized data to be communicated from the electricity market (bids, and cleared prices) as well as any operators' over-riding actions The use of this data is to monitor likely problems.

Faster-rate PMU data, combined with the traditional SCADA and DLR units data is used to monitor deviations from the schedules within 15 minutes. This data is ultimately useful for setting up specifications for enhanced automatic generation control (AGC), automatic voltage control (AVC) and automatic flow control (AFC) using installed Mills in order to maintain the line flows within the (slower) dynamically changing line ratings. PMU-enabled AVC and AFC are combined.

On-Site (NYISO and NYPA) Off-Line Data Gathering, Simulations in the Adaptation Module and Comparison of Results to the Current Operations and Planning Practices—

The present arrangement provides a setup for using data as they become available for analyzing, sending signals to WASA module 136 about possible problems on transmission system 102 and making the information available to system operators 132 in an advisory way about what may be the effective equipment adjustments. The result is not used on-line, but every effort is made to pro-actively collect, archive, data as well as the results of the analysis.

The basic differences between the actions taken by system operators 132 using results of earlier worst-case studies and power flow analysis to decide how to adjust optimal real power dispatch done by the electricity market module in order to ensure that the power flow is feasible and all constraints are within the limits is assessed and interpreted.

The present system enables regularity power in an automated way as conditions change as well as to control real power exchanges with the neighbors. Simulations are carried out to assess problems and benefits from defining reactive power zones in several different ways (unity power factor, vs. reactive power exchanges for minimizing large reactive power loop flows, and the like).

Assuming that the identified lines are equipped with DLR units, on-site off line simulations are carried out to demonstrate potential benefits in operations planning, and, ultimately, in real-time operations. It is necessary to install a stand-alone computer and NYPA with NETSSWorks software to collect data as it is made available, run the software to determine the best adaptation of equipment and to compare the results with the actions taken by system operators 132. Gathering data and performing the required sensitivity analysis is done after sending time stamped state estimation data after the fact on a regular basis, say at the end of each day for an entire year. This is used to develop statistical characterization of power flow patterns which are useful for achieving benefits from coordinated equipment adjustments. If possible, time stamped data about the actual line limits obtained using DLR units is also used for comparing benefits with and without the information about actual line ratings.

Knowing the Transfer Capacity of the Transmission Line in Real Time—

The fundamental benefit of the chosen DLR technology is that it provides the true line capacity in real time. This technology has been used by other utilities in real time operation. Knowing the true capacity of the transmission line and pairing it with the voltage and stability information provided by the PMU's adds more accuracy and . . . for the operator to operate the grid more reliably, optimally and efficiently.

Once the design of the conductor is decided by the utility engineer, the transfer capacity of any overhead transmission line is directly affected by weather conditions, especially wind which varies randomly, spatially and substantially. In New York State as around the world, the transmission capacity is currently fixed based on assumed weather conditions. These assumed weather conditions may be constant throughout the year or might be adjusted seasonally to set the capacity limit of a transmission line.

The present dynamic line rating technology provides the capacity of the transmission line in real time, taking into consideration actual weather conditions and, particularly, the effect of wind variability.

In a Smart Grid environment it is necessary to know the true capacity of the grid backbone, its transmission lines, in real time. This is necessary in order to optimize the existing transmission assets and enhance reliability of the system (sec benefit below). Knowing the line capacity in real time is especially important for this demonstration project because the PMU output will be combined with the DLR output for optimum asset utilization, operational efficiency, and enhances wide area situational awareness (WASA), (see benefit below).

Improve Generation Dispatch to Improve Reliability and Lower Costs—

Production cost studies can point toward congestion cost savings. Analysis is performed of production costs and the economic impact of actual dispatch decisions made on the day after the event, in part, as a training exercise to improve dispatcher and operator performance. For example, in order to supply a congested bus a large steam turbine may have been started when staged startup of several smaller gas turbines may have been sufficient and would have resulted in lower economic cost.

Once DLR is deployed in NY State on transmission lines at risk for thermal congestion, a history of thermal capacity improvement potential is recorded. For example, lines that either operate close to their thermal limit under normal conditions (all system equipment in operation), or lines that would operate close to their limit under emergency or other special condition e.g. if some other lines or pieces of equipment go suddenly off-line due to contingencies, or if some equipment is out for scheduled maintenance).

Improved Asset Utilization and Operational Efficiency—

U.S. Department of Energy's "Smart Grid System Report", July 2009 cited DLR as one of eight Smart Grid Metrics for T&D Infrastructure. DOE recognized the maturity of the technology and its nascent penetration. "The deployment of dynamic line rating technology is also expected to increase asset utilization and operating efficiency . . . " " . . . optimized capacity can be attainable with dynamic ratings, which allow assets to be used at greater loads by continuously sensing and rating their capacities."

Localized Weather Monitoring—

Tension-based DLR system provides data on localized weather events including ambient temperature and average conductor temperature. It also provides very accurate measurement of ice formation, which can be measured in mm and pounds/ft as it accumulates on the rated lines. This can be useful in deployment of emergency services and, where loading methods permit loading increases, direct mitigation.

Line to Ground Clearance

Line to Ground clearance is set by the transmission design engineer in the setting of maximum conductor temperature. DLRs monitor actual conductor temperature and regulate it constantly and in real time so that violations are avoided.

Reduced Operator Intervention and Reliability Improvement—

With knowledge of actual transmission capacity operators are able to avoid dispatching to assumed ratings; ratings that are wrong most of the time. Any time the grid is taken off its optimum dispatch reliability is deteriorated. Software provides interrogation and "what if?" scenarios. Controlling unnecessary operator interventions with dynamic ratings both increases the reliability of Bulk-Power System and improves its economy, Wide Area Situational Awareness—

It has been shown through simulation that for certain credible contingencies on a power system, there can occur unacceptable consequences that are characterized by severe low voltages, excessively high power and MVar flows, and likely split-up of a utility's interconnections. System studies have shown that a combined measurement of phasor measurements and power flow can be used to provide a robust (both dependable and secure indication of proximity of power system collapse. DLRs provide accurate, (usually) enhanced power flow potential with which power flow can be optimized. A stressed power system is characterized by widening angular separation of bus voltage angles as it moves towards voltage insecurity. Decision Trees exploit the complex non-linear relationship between voltage security status and generator Vars/angular difference in term of hierarchical rules extracted from a large number of off-line load-flow simulations. The improved security via load shedding and re-connecting the lines is possible. Proof-of concept obtainable through such actions has already been done by NETSS as pa of CEATI project.

For example, large modern wind turbines begin to generate electricity at wind speeds of 4 m/sec while most transmission lines are rated at less than 1 m/sec. A 20 mile transmission line (795 ACSR) with a static thermal rating of 787 amps at 40° C. ambient, zero wind, and mid-day summer which experiences a wind increase of 1 m/sec will see a rating increase of:

45° angle+35% capacity . . . 1,060 amps 90° angle+44% capacity

While wind turbines are at higher elevations and can turn into the prevailing wind and transmission lines are fixed, significant transmission capacity improvement (15% or more) can be expected . . . even miles from the wind farm. The utilization of the technologies of the present arrangement enhance prospects for rapidly delivering wind power over existing lines without extensive permitting delays.

Performance Metrics—

Enhanced Reliability by Coordinated Equipment Adjustments to Meet (N-1)—

For non-time critical contingencies a corrective rather than preventive (N-1) adaptation of equipment after the contingency has occurred could be very beneficial. For example, with WASA in place, it is no longer necessary to only rely on off-line simulations for the worst case scenarios. It is necessary to manage more and more hard-to-predict transmission system conditions. The deterministic notion of the worst-case design must be relaxed. Instead, it's advantages to operate the transmission system with high confidence by taking into consideration probabilistic characterization of both system inputs and contingencies. This long-overdue goal has been recently emphasized in NERC's documents on wind integration. The need for probabilistic approach to managing wind reliably is endorsed. Explicit measures of reduced need for reserves is used to quantify how much better one can do with the combined IT (PMUs, DLR units and better state estimation) and optimization technologies.

Enhanced Reliability by Coordinated Equipment Adjustments to Meet the (N-1-1) Criteria—

Meeting the (N-1-1) criteria using the framework proposed is potentially one of the most powerful benefits of the present arrangement. The (N-1-1)) criteria means that the system should be capable of withstanding when the first contingency occurs and is followed by half an hour window during which the operator could adjust other equipment system-wide to bring the system back to a less vulnerable state in case the second contingency occurs. Utilizing the present arrangement for optimizing the transmission system after the first contingencies, results in much smaller reserve requirements than if the equipment settings are not optimized after the first contingency occurred.

Reduced O&M Cost—

The estimated savings based on representative cases are 3-5% during normal conditions and 10-20% savings on reserves needed for reliability.

Enabling as Much Reliable Integration of Intermittent Resources (Wind Power and Responsive Demand) as Possible—

It is likely that due to voltage and/or reactive power balancing constraints it is not possible to send all the wind power available as system conditions change. However, everything else being the same, much more wind power can be utilized with adaptive equipment adjustments, T&D controllable equipment settings in particular, in accordance with the present invention.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A system for power grid management, said power grid having a plurality of generators, transmission lines, transformers, loads and control equipment, said system comprising:

a communication system for collecting voltage and current data from a first plurality of locations along said plurality of transmission lines, wherein said voltage and current data is supplied to said communication system via at least one phasor measurement unit located along at least one of said power transmission lines in said grid, and wherein said communication system is further configured to collect physical line data corresponding to real time ambient conditions associated with a second plurality of transmission lines selected among said transmission lines based on a determination of key lines based on combination of line flow limits and expected wind conditions on said second plurality of lines, said ambient conditions corresponding to thermal line limits of said second plurality of transmission lines indicating a maximum safe current that can be loaded onto said lines at said ambient conditions;

a state estimation module, configured to receive the voltage and current data from said first plurality of locations as well as said physical line data from said second plurality of transmission lines corresponding to said maximum safe current associated with said thermal tine limits and to generate a continuous series of real time state estimations of a totality of the operating conditions said transmission lines in said entire grid, said estimations including voltages and currents at every location of each of said lines in said grid;

a wide area situational awareness module configured to receive said continuous series of real time estimations output from said state estimation module that was based on said voltage and current data as well as said physical line data corresponding to thermal line limits of said second plurality of transmission lines in said grid and configured to retrieve equipment limit data and to generate a series of system states and limits based on the differences between said output of said state estimation module and said equipment limits; and an adaptation module configured to receive an output from said wide area situational awareness module and further configured to calculate a continuous series of control actions for said control equipment based on said real time system state and thermal limits for said transmission lines as output from said wide area situational awareness module, said control actions including selection of transmission line usage of said plurality power transmission lines on said grid.

2. The system as claimed in claim 1, wherein said communication system is additionally configured to receive input from a plurality of monitoring devices, each located along said power transmission line and each configured to provide power transmission line electrical and thermal data.

3. The system as claimed in claim 2, wherein said monitoring devices are dynamic line rating devices and additional phasor measurement units.

4. The system as claimed in claim 1, wherein said output from said wide area situational awareness received by said adaptation module is said grid state and said static and dynamic power transmission line equipment limits, wherein said adaptation module is configured to calculate control actions for said control equipment based on said grid state and said static and dynamic power transmission line equipment limits.

5. The system as claimed in claim 4, wherein transmission line state, determined by wide area situational awareness module and received by said adaptation module includes at least a plurality of optimizable criteria, including at least criteria related to grid system reliability, transmission line operation cost, and transmission line efficiency.

6. The system as claimed in claim 5, wherein said adaptation module is configured to select at least one optimizable criterion from the available optimizable criteria to optimize using said calculated control actions.

7. The system as claimed in claim 6, wherein said calculated control actions are provided to a system operator as advisory actions.

8. The system as claimed in claim 6, wherein said calculated control actions are provided directly to said control equipment.

9. The system as claimed in claim 6, wherein said calculated control actions for said control equipment is configured to generate a calculated control action for a power transmission line control equipment to increase power throughput through said power transmission line above a power threshold called for under said worst case scenario (N-1) standards when said real-time power transmission line capacity and environmental factors exceed estimated power transmission line capacity and environmental factors defined by said worst case scenario (N-1) standards.

10. The system as claimed in claim 6, wherein said calculated control actions for said control equipment is configured to generate a calculated control action for a power transmission line control equipment to increase power throughput through said power transmission line above a power threshold called for under said worst case scenario (N-1-1) standards when said real-time power transmission line capacity and environmental factors exceed estimated power transmission line capacity and environmental factors defined by said worst case scenario (N-1) standards, such that after a first predefined contingency event, a transmission line system operator can adjust said control equipment back to a less vulnerable state using a smaller reserve requirement than if settings of said transmission line equipment were only adjusted off-line based on said worst case scenario (N-1-1) standard.

* * * * *